Sept. 7, 1926.

P. HANSMANN ET AL 1,598,682

ANTISIDE DRAFT PLOW HITCH

Filed Nov. 12, 1920   2 Sheets-Sheet 1

Inventors,
Paul Hansmann
Herman Strack
by H. S. Johnson
their Attorney.

Sept. 7, 1926.  
P. HANSMANN ET AL  
ANTISIDE DRAFT PLOW HITCH  
Filed Nov. 12, 1920    2 Sheets-Sheet 2
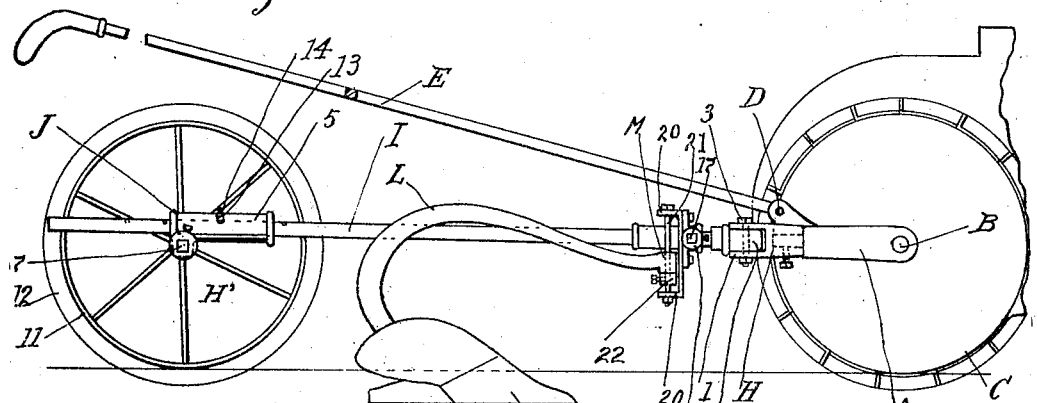
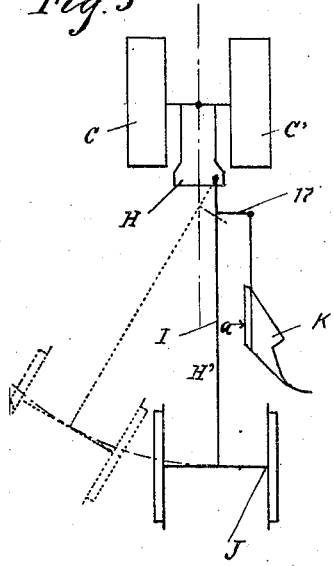
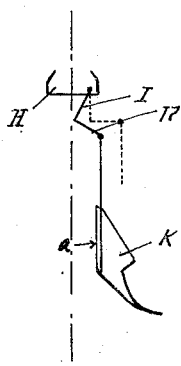
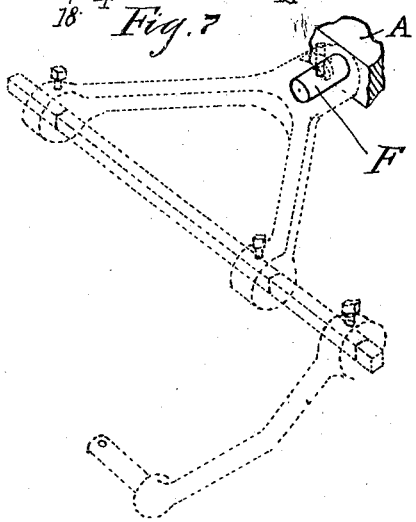
Inventors,  
Paul Hansmann  
Herman Strack  
by H. S. Johnson  
their Attorney.

Patented Sept. 7, 1926.

1,598,682

UNITED STATES PATENT OFFICE.

PAUL HANSMANN AND HERMAN STRACK, OF LONG PRAIRIE, MINNESOTA, ASSIGNORS, BY MESNE ASSIGNMENTS, TO THE SAID HANSMANN.

ANTI-SIDE-DRAFT PLOW HITCH.

Application filed November 12, 1920. Serial No. 423,672.

This invention relates to mechanism for controlling plows hitched to tractors and more particularly to means for counterbalancing irregularly hitched loads to eliminate side draft and effectively distribute the work over both traction wheels.

One object of the invention is to provide improved counterbalancing means in connection with a widely offset plow, relative to the center of draft of the tractor, so that the plow will cut a furrow in the trail of one of the traction wheels, thereby enabling the tractor to travel on unplowed ground.

Many disadvantages result from the common practice of running one traction wheel in the furrow. When the tractor is tilted, both drivers ride on the edge of their respective rims instead of on the entire face thereof thereby seriously reducing the traction capacity.

To hitch a plow in widely offset position, with respect to the center of draft of the tractor, increases the work for one wheel and decreases it for the other, thereby setting up a tendency in the relieved wheel, to circle around the overloaded one. This tendency is checked by a constant operation of the steering mechanism to prevent the tractor from running into the plowed ground.

Further, the excessive side draft set up at the landside of the plow in its tendency to travel in a resultant direction toward the center of draft of the tractor, when added to the uneven apportionment of the load mentioned in the foregoing, causes the traction wheels to skid into the adjacent furrow. Especially is this the case with the type of tractor represented in the accompanying drawings, which are steered by means of a handle by an operator standing on the ground.

A further object of the invention is to provide plow connecting mechanism which will eliminate these disadvantages, be easily handled and capable of being readily adjusted to accommodate the varying side drafts developed by different sized plow shares. To this end one form of our invention consists in the construction, combination and arrangement of parts hereinafter described and claimed.

In the drawings—

Figure 2 is a side view of same.

Figure 5 is a diagrammatic view of the tractor equipped with the invention.

Figure 6 is a fragmentary diagram showing the plow moved out of normal position and Figure 7 is a perspective view of the stub shaft of the tractor showing in dotted lines the supporting frame for the ordinary caster wheels (not shown).

Figure 1:
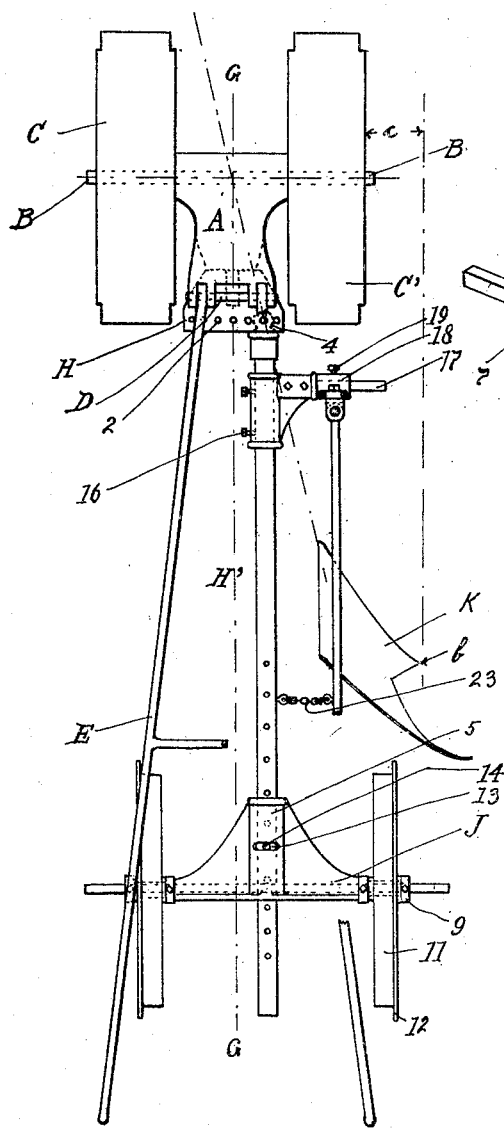
Figure 1 is a top view of a two wheel tractor diagrammatically representing a tractor showing the invention connected for use.
Figure 3:
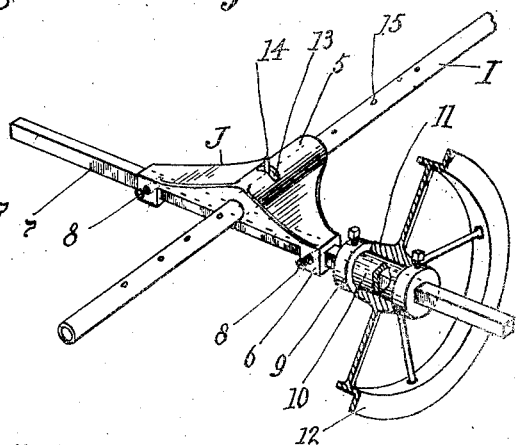
Figure 3 is a fragmentary perspective view of the balancing truck.
Figure 4:
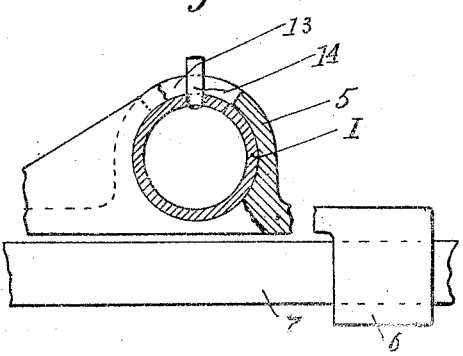
Figure 4 is an enlarged vertical sectional view of a part of the axle and tongue of the balancing truck.

A represents part of the frame, B the axle and C and C' the traction wheels of a tractor. D designates a pivot pin pivotally supporting the rearwardly extending steering handle E, whereby the tractor may be bodily turned to direct its course of travel. F designates a stub shaft the axis thereof being coincident with the center line G—G, which latter defines the center of draft of the tractor. Normally, the stud F supports a frame work shown in dotted lines (Figure 7) which in turn carries a pair of wheels (not shown). K is a plow share and L the plow frame, the beam thereof terminating in a hub M.

Our invention comprises a draw head H and a truck H', consisting of a tongue I and a wheeled element J, slidable on the truck tongue. The draw head fits removably over the stub shaft F and is held thereon by suitable set screws, so that the invention may be readily attached to an ordinary Beeman tractor. The draw head further consists of two rearwardly extending horizontally disposed vertically spaced plates 1, having a transverse row of apertures 2 to receive the pivot bolt 3, which latter is projected through the eye 4 of the tongue. Thus the tongue may be adjusted in the draw head to vary the offset with respect to the line G—G. Slidable on the tongue is the sleeve 5 formed with outwardly spreading webs having two rectangular transversely disposed sockets 6 adapted to receive the squared axle 7 which latter is firmly held positioned by set screws 8. Slidable on each end of the axle are a pair of collars having between them the bushing 10. Rotatable on the bushing is the wheel 11 formed with an outstanding flange 12 at the outer edge of its rim. By sliding the collars and bushing on the axle the spread of the wheels may be changed, the collars having suitable set screws to hold the wheels positioned.

In the top of the sleeve is the transverse slot 13, loosely receiving the retaining pin 14, which latter fits the holes 15 in the upper side of the tongue, whereby the wheeled element J is rendered oscillatory to yield on uneven ground. Adjustable longitudinally on the tongue by means of the set screws 16, and extending outwardly at right angles therefrom is the arm 17. The arm is square in cross section, and has slidable thereon a sleeve 18 provided with set screws 19, whereby it may be adjustable on the arm to change its position. The sleeve is formed with vertically spaced outwardly extending lugs 20 supporting a vertically disposed rod 21 slidably fitting an opening in the hub M of the plow. A collar 22 having a suitable set screw, is slidable on the rod 21 and serves to hold the plow at the desired level.

A slack chain 23 extending from the plow frame L to the tongue I serves as a precautionary measure to prevent the truck from swinging violently away from the plow, should the wheels become accidentally disengaged from the ground.

As explained in the foregoing an offset plow tends constantly to move toward the center of draft of the tractor or in a line parallel therewith as shown in Figure 6, wherein the dotted lines indicate the normal offset position of the plow and the solid lines, the position it constantly tends to reach, if there was no provision to counterbalance the side draft at the landside a of the plow. To counterbalance this side draft and the rearward pull on the arm 17 we have provided the truck H′, the weight of the wheeled element thereof and its traction resistance together with the resistance afforded by the flange 12 of the wheels against skidding, form an effective means whereby to eliminate the side draft and distribute the load evenly to the traction wheels.

The best working position of the truck in the draw head must be found by trial according to the nature of the soil, the wheeled element J operating like the balance weight of a scale to be shifted back and forth on the tongue I until the pull on the bar 17 is counterbalanced.

The best position of the plow share is also found by trial, as the point b of the share may be set to leave more or less of a margin at c (Fig. 1) according to the nature of the soil.

While we have shown our invention applied to a two wheel tractor it is to be understood that other types of tractors may be used.

We claim:

1. In a plow of the motor-drawn type, a tongue member pivotally connected to the tractor draw-bar, a two-wheel truck attached to a rearward portion of the tongue members, a bracket member extending laterally toward the furrow side from a forward portion of the tongue member, and a plow pivotally connected to the bracket to operate in a position in advance of one of the truck wheels.

2. In a plow of the motor-drawn type, a tongue member pivotally connected to the tractor draw-bar, a two-wheel truck attached to a rearward portion of the tongue member and having limited pivotal movement about the tongue as an axis, a bracket member carried by the tongue near the forward end thereof and extending laterally toward the furrow side, a plow, and a universal joint connection between the forward end of the plow beam and the bracket.

3. In a plow of the motor drawn type, a tongue member pivotally connected to the tractor draw-bar, a two-wheel truck attached to a rearward portion of the tongue member and adjustable longitudinally of the tongue member, said truck being mounted for limited pivotal movement about the tongue as an axis, a bracket extending laterally toward the furrow side from a forward portion of the tongue member, a plow pivotally connected to the bracket in a position to travel ahead of a wheel of the truck, and a flexible connection between the plow and the tongue member.

4. In a plow of the motor-drawn type, a tongue member pivotally connected to the draw-bar of the tractor, a two-wheel truck attached to a rearward portion of the tongue member and adjustable longitudinally of the tongue member, said truck being mounted for limited pivotal movement about the tongue as an axis, a bracket extending laterally toward the furrow side from a forward portion of the tongue member, said bracket being adjustable longitudinally of the tongue, and a plow pivotally connected to the bracket in advance of a wheel of the truck.

5. In a plow of the motor-drawn type, a tongue member pivotally connected to the tractor draw-bar, a two-wheel truck attached to a rearward portion of the tongue member and adjustable longitudinally of the tongue member, said truck being mounted for limited pivotal movement about the tongue as an axis, a bracket mounted on a forward portion of the tongue member for longitudinal adjustment thereon, said bracket extending laterally toward the furrow side, a plow pivotally connected at its forward end to the bracket to operate in a position between a wheel of the tractor and a wheel of the truck, and a connection limiting the lateral separation between the plow and the tongue member.

In testimony whereof we affix our signatures.

PAUL HANSMANN.
HERMAN STRACK.